United States Patent [19]

Densow

[11] Patent Number: 5,669,468

[45] Date of Patent: Sep. 23, 1997

[54] BRAKING METHOD AND APPARATUS

[76] Inventor: Max Densow, 3577 Galena, Auburn, Calif. 95603

[21] Appl. No.: 549,030

[22] Filed: Oct. 27, 1995

[51] Int. Cl.$^6$ .................................................. F16D 65/10
[52] U.S. Cl. ........................... 188/75; 188/76; 188/218 R
[58] Field of Search ........................ 188/218 R, 75, 188/76

[56] References Cited

U.S. PATENT DOCUMENTS 1,674,851  6/1928  Boykin, Jr. ......................... 188/218 R
4,458,573  7/1984  Isaka ......................................... 84/95 R

FOREIGN PATENT DOCUMENTS 1143907  3/1985  U.S.S.R. ............................ 188/218 R

Primary Examiner—Matthew C. Graham
Attorney, Agent, or Firm—Herbert C. Schulze

[57] ABSTRACT

A braking method and apparatus wherein a rotating mechanism includes a deformable rotor carried by the rotating mechanism with pressure rollers suitable to contact the exterior of the deformable rotor and apply pressure to deform the rotor and thus cause the deformed rotor to resist rotation, resulting in a braking action.

7 Claims, 2 Drawing Sheets

BRAKING METHOD AND APPARATUS

CROSS REFERENCE TO RELATED PATENT APPLICATIONS

There are no patent applications filed by me related to the within application.

BACKGROUND OF THE INVENTION

1. Field of the Invention

This invention is in the general field of braking systems for rotating mechanisms such as automotive vehicles, aircraft landing gear, industrial machinery, and the like;

The invention is more particularly directed to a braking system using an auxiliary rotor as the braking apparatus;

The invention is even more particularly directed to such a braking system wherein braking is accomplished by deformation of an auxiliary rotor by pressure on the exterior of such rotor applied through a rotatable member.

2. Description of the Prior Art

There are numerous braking systems for rotating mechanisms well known to those skilled in the art. In general all braking systems rely upon a sliding friction pressure applied to a brake drum, or the like, by pressure pads, or the like.

The present invention provides a totally new braking concept wherein the braking effect is accomplished by deforming an auxiliary rotor attached to the device to be braked, wherein the auxiliary rotor is deformable so as to be altered from a true circular exterior shape to an oval shape, thus accomplishing the braking through an inability to continue in a circular rotating path.

I do not know of any previously existing braking mechanism using such a system wherein an auxiliary rotor is actually deformed to accomplish a braking effect on a rotating mechanism. In this sense, I believe there is no true prior art to this invention.

SUMMARY OF THE INVENTION

Braking systems are in wide use on all types of mechanisms in which rotating motion is used. Such mechanisms include Automotive vehicles, aircraft landing gear, factory machinery, and the like.

Machinery, when operating, particularly large vehicles, aircraft on the ground, and the like, must be capable of stopping efficiently and quickly for safety reasons. Braking systems are used for such stopping. In general, braking systems employ friction pads, and the like, to accomplish the desired stopping effect.

Many of the braking systems in present use are very costly and the maintenance (replacing of worn brake shoes, and the like) is costly and may result in considerable loss of useable time for the machinery concerned.

The cost of such machinery as large aircraft, highway trucks, trains, and the like, is such that time lost is a sizeable expense item.

I have studied the various braking systems in common use and I have attempted to devise a method and apparatus for braking which is virtually maintenance-free.

I have now conceived, and perfected a unique system for braking, in which the braking apparatus is designed to be as nearly as possible totally maintenance-free. I have accomplished this by providing an auxiliary cylindrical rotor attached to the shaft, or axle, of a rotating machine, which rotor is deformable to an oval shape by pressure rollers. When deformed by the rollers, the oval shape causes effective braking, with virtually no friction on the braking surfaces. The lack of friction causes the braking system of my new invention to be virtually maintenance-free. There are no brake shoes, pads, calipers, or the like, to wear out and be replaced.

Thus, it is a object of this invention to provide an essentially maintenance-free braking system;

Another object of this invention is to provide such a braking system wherein there are no brake shoes, pads, or the like to wear out and require replacement;

Another object of this invention is to provide such a braking system wherein the braking is accomplished by deformation of a cylindrical member into a oval shape.

The foregoing and other objects and advantages of this invention will become apparent to those skilled in the art upon reading the following description of a preferred embodiment in conjunction with a review of the appended drawings.

DESCRIPTION OF A PREFERRED EMBODIMENT

Figure 1:
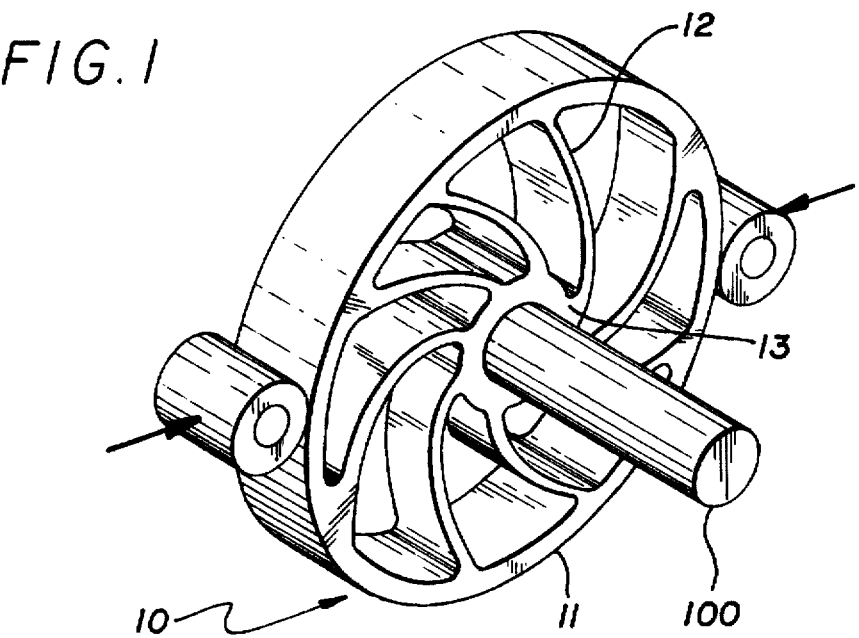
FIG. 1 is a schematic, partially sectioned, perspective of an apparatus suitable to practice the method of this invention.

FIG. 1 shows the essential elements of this invention in a schematic perspective. It must be understood that these elements will be connected to the frame, or other elements, of a mechanism to which the braking system of this invention applies. The invention comprises a rotor element, generally 10, fixedly attached to a driving shaft 100 at hub 13 by welding, keying, or otherwise fixedly (but removably) attached at 16.

A plurality of flexible, spring like, blades, or fins, 12 extend between the hub 13 to the outer rotor rim 11. The blades 12 are, preferably, integrally formed with the rotor rim 11 at 14, and the rotor hub 13 at 15, as shown. It must be noted that the blades 12 could be welded, riveted, or otherwise attached without departing from the inventive concepts disclosed.

At this time it must be recognized that there are various structures which could be used to create a deformable auxiliary rotor. It is possible to have the rotor suspended by intercommunicating hydraulic cylinders in a closed circuit; It is possible to have deformable and segmented discs supporting the rotor; Many other specific mechanical configurations have been recognized by me as being possible. At present, I believe the mechanical configuration illustrated is the best configuration to practice this invention.

Figure 2:
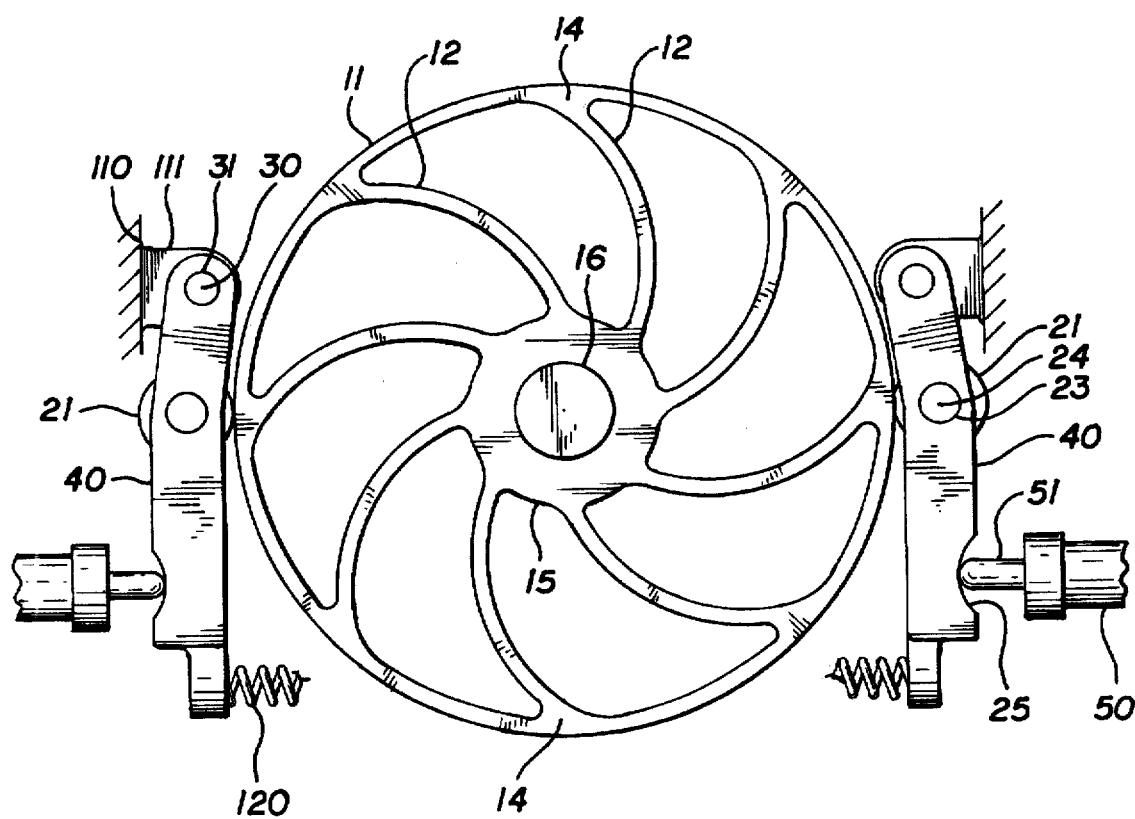
FIG. 2 is a schematic front end elevation on FIG. 1 with additional elements shown.

Paying particular attention to FIG. 2 it will be noted that lever arms 40 are pivoted by a customary pivot arrangement 111-30-31, known to those skilled in the art, against the mechanism frame 110. The pivot arms 40 carry rollers 21 on shafts 24, journaled at 23 (the details are not shown, since they are known to those skilled in the art i.e. roller, ball, or other, bearings). Pivot arms 40 receive cylinder pistons 51 at 25 in a manner known to those skilled in the art. The cylinders 50 will be anchored by conventional means to the frame 110 of the mechanism and will receive hydraulic, or other, pressure (details not shown, but known to those skilled in the art). A return spring 110, anchored by conventional means to the frame 110 of the mechanism, will relieve pressure of the rollers 21, when desired.

Figure 3:
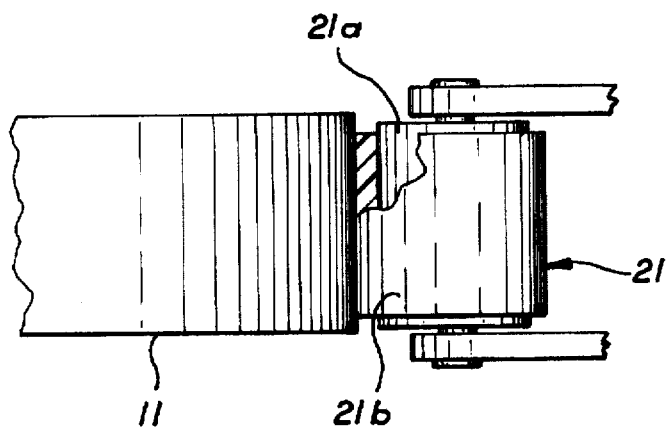
FIG. 3 is an enlarged partially sectioned, partially broken away elevation on the left side of FIG. 2 at the contact point of the rotor 11 with pressure roller 21.

FIG. 3 shows the rotor surface 11 and the roller 21, which is actually a steel roller, or the like 21a coated with teflon, or the like 21b. In actuality, a roller of any material may be used. However, I have found that a steel roller with a plastic (teflon, or other) coating is excellent for practicing this invention.

Figure 4:
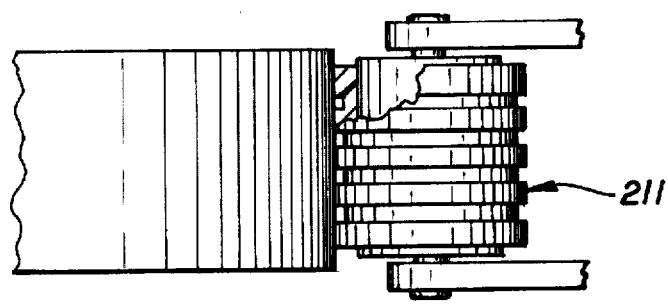
FIG. 4 is a view similar to FIG. 3 showing an alternate embodiment of the pressure roller.

Although the heat build up in operating models of this invention is negligible, I have found that it can be reduced to virtually zero by grooving the coating as shown at 211 in FIG. 4.

Figures 5, 6:
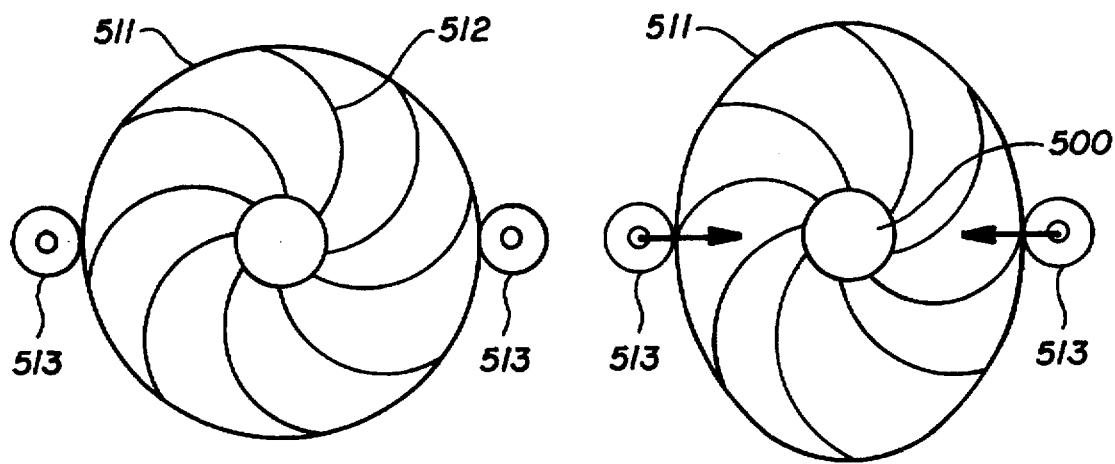
FIGS. 5 and 6 schematically show, in exaggerated form, the principle of this invention.

FIGS. 5 and 6 are exaggerated schematics showing the principles of this invention at work.

In FIG. 5, a rotor 511 with spring blades 512 attached to axle, or shaft, 500 are shown while engaged in normal operation (rotation assumed to be presently in effect). Rollers 513 are at rest.

In all of the illustrations, there are shown eight of the spring-like blades between the hub and the exterior of the deformable rotor. This is not necessarily a magical number. Depending upon size, and mechanical features desired this could be nearly any number of blades. However, it is generally believed preferable that there be an even number of blades, as this will best distribute the deforming forces exerted by the roller pressure against the rotor.

In FIG. 6, the rollers 513 are activated with inward pressure towards the shaft, or axle, 500. The elongation of the rotor surface 511 is indicated.

It is possible to practice the method of braking by deformation of the auxiliary rotor using only one pressure roller. In such a case, the deformation will take place by the pressure of the pressure roller against the rotor, with the shaft, or axle, exerting the other pressure against the interior of the rotor vanes. This is not considered most desirable, however, since this creates excessive force against the shaft, or axle, bearings, and the shaft, or axle, itself.

In this description of a preferred embodiment, reference has been made to a shaft, or axle. It is understood that when reference is made to shaft, or axle, it is intended to include any rotating device. It may be a wheel, or the like carried by a shaft or axle, or any other rotating apparatus. It is further understood that where reference is made to a frame, or the like, it is meant to include any frame, or mounting structure, to which the rotating apparatus is connected.

While the embodiments of this invention specifically shown and described are fully capable of achieving the objects and advantages desired, it is to be understood that such embodiments are for purposes of illustration and not for purposes of limitation.

I claim:

1. The method of braking a rotating mechanism carrying a deformable cylindrical rotor comprising: moving a first roller into contact with an exterior surface of the deformable cylindrical rotor; exerting pressure on the roller against the exterior surface of said deformable cylindrical rotor causing the deformable cylindrical rotor to deform thus braking the rotating mechanism due to reduced ability of the deformed cylindrical rotor to continue normal rotation.

2. The method of claim 1 wherein a second roller is moved into contact with the exterior surface of the deformable cylindrical rotor at a point diametrically opposed to the position of the first roller, and wherein pressure is applied simultaneously and equally by the first and second rollers against the exterior surface of said deformable cylindrical rotor, causing the rotor to deform thus braking the rotating mechanism by reason of the reduced ability of the deformed cylindrical rotor to continue normal rotation.

3. A braking apparatus for a rotating mechanism having a shaft and a frame comprising: a deformable cylindrical rotor having an exterior rotor surface affixed to said shaft; a first roller means movably connected to said frame in such manner that said roller means may be moved into contact with said exterior rotor surface; pressure means connected to said roller means and said frame in such manner that pressure may be applied to said roller means against said exterior rotor surface.

4. The apparatus of claim 3 wherein a second roller means is movably connected to said frame in such manner that said second roller means may be moved into contact with said exterior rotor surface at a point diametrically opposed to said first roller; pressure means connected to said second roller means and said frame in such manner that pressure may be applied to said second roller means against said exterior rotor surface.

5. A braking apparatus for a rotating shaft mounted upon a frame comprising: a hub affixed to said shaft; a plurality of blades connected to said hub and radiating outwardly a distance therefrom to uniform terminal positions; a deformable rotor surface affixed to said blades at the terminal positions and surrounding said hub at a uniform radial distance therefrom; first pressure roller means movably mounted upon said frame in such manner that said first pressure roller means may be moved radially toward said hub so as to exert pressure upon said deformable rotor surface; pressure means connected to said first pressure roller means suitable to exert pressure upon said first pressure roller means against said deformable rotor surface; second pressure roller means movably mounted upon said frame in such manner that said second pressure roller means may be moved radially toward said hub, and diametrically opposed to the direction of movement of said first pressure roller means so as to exert pressure upon said deformable rotor surface in a direction diametrically opposed to the pressure of said first pressure roller means against said deformable rotor surface; first pressure means connected to said first pressure roller means and said frame in a manner suitable to exert pressure upon said first pressure roller means against said deformable rotor surface; second pressure means connected to said second pressure roller means and said frame in a manner suitable to exert pressure upon said second pressure roller means against said deformable rotor surface; and means to activate said first and second pressure means.

6. The apparatus of claim 5 wherein each of the pressure roller means includes a metallic core surrounded by a plastic outer sleeve.

7. The apparatus of claim 6 wherein the plastic outer sleeves include a multiplicity of circumferential grooves on their exterior surfaces.

* * * * *